United States Patent
Holland

(10) Patent No.: US 6,730,205 B2
(45) Date of Patent: May 4, 2004

(54) METHOD FOR REMOVING CONTAMINANTS FROM CONDUITS AND FLUID COLUMNS

(76) Inventor: Herbert W. Holland, 2314 Chimney Rock Rd., Houston, TX (US) 77056

( * ) Notice: Subject to any disclaimer, the term of this patent is extended or adjusted under 35 U.S.C. 154(b) by 187 days.

(21) Appl. No.: 10/038,017

(22) Filed: Jan. 3, 2002

(65) Prior Publication Data

US 2003/0121862 A1 Jul. 3, 2003

(51) Int. Cl.[7] .................................................. C02F 1/48
(52) U.S. Cl. ...................... 204/557; 204/563; 204/571; 210/695
(58) Field of Search .................................. 204/557, 563, 204/571, 660, 664; 210/695, 222

(56) References Cited

U.S. PATENT DOCUMENTS

| | | | | |
|---|---|---|---|---|
| 4,746,425 A | * | 5/1988 | Stickler et al. | 210/175 |
| 4,879,045 A | * | 11/1989 | Eggerichs | 210/695 |
| 5,616,250 A | * | 4/1997 | Johnson et al. | 210/695 |

* cited by examiner

*Primary Examiner*—Roy King
*Assistant Examiner*—William T. Leader

(57) ABSTRACT

A method and apparatus for the treatment of fluid columns uses an air-cooled electromagnetic field generator to prevent the deposition and accumulation of contaminants within conduits and on equipment utilized in the transportation, delivery and processing of the fluid columns. The instant invention may be utilized to accelerate the separation of oil and water and increase the efficiency of such separation apparatus.

2 Claims, 5 Drawing Sheets

METHOD FOR REMOVING CONTAMINANTS FROM CONDUITS AND FLUID COLUMNS

BACKGROUND OF THE INVENTION

The present invention relates to the extraction of scale, corrosion, paraffin, asphaltene and other types of contaminant deposits that form within conduits and on the surfaces of equipment utilized in the transmission of fluid columns. The instant invention further relates to the separation of contaminants and other pollutants from fluid columns transferred in such conduits.

It is common for contaminant deposits to accumulate within conduits and on equipment utilized in the transportation and transmission of fluids. In oilfield pipelines, for example, a mixture of oil, water and minerals flow out of a well and into equipment used to separate the marketable oil from water and other components of the fluid column. Paraffin, asphaltene and mineral scale deposits forming within conduits used to transport this fluid mixture restrict flow within the pipeline. Such deposits and the congestion they create typically lead to the deterioration of pumps, valves, meters and other equipment utilized to propel and monitor the flow of fluid through the pipeline system. These types of deposits typically result in lost production and substantial expenditures for thermal, mechanical or chemical remediation to achieve full flow within the pipeline.

Many thermal exchange systems, such as cooling towers or boilers, utilize water as a heat transfer medium. Mineral scale and corrosion deposits restrict the flow of water and clog the orifices of pumps, valves and other equipment. Further, deposits within piping systems and on thermal exchange grids tend to act as a layer of insulation and inhibit the transfer of heat carried by the water. Periodic descaling of heat exchange equipment typically results in process downtime and substantial labor and remediation expenditures. Therefore, contaminant deposits result in restricted flow, lost efficiency and increased energy consumption in thermal exchange systems.

In closed-loop systems where water is continuously circulated to facilitate heat transfer from one area of a system to another, one common method of removing corrosion, scale deposits and controlling algae and bacterial growth utilizes chemical treatment of the water. Over time, the build-up of chemicals, minerals and other contaminants results in the chemically treated water being unfit for continued use. Chemical laden water typically requires additional treatment to make it suitable for discharge into a wastewater disposal system or release into the environment. Chemical treatment of fluid columns is costly, requires the storage, handling and dispensing of dangerous chemicals and increasingly gives rise to growing environmental concerns directed to the quality of the water being discharged.

The effectiveness of these prior art methods is marginal and generally unsatisfactory. One alternative has been the utilization of magnetic treatment wherein magnetic flux is introduced to a contaminated fluid column. Magnetic field generators are commonly divided into two groups, permanent magnets and electromagnets. Each group produces magnetic energy that may be utilized to treat fluid columns. The density of the magnetic flux available in the fluid treatment area, which is typically the interior of a conduit through which contaminated fluids flow, may be measured and expressed in Gauss Oersted units. Commonly referred to as "gauss", this unit of measurement is useful in the comparison of devices used in magnetic fluid treatment. While the use of magnetic flux has proven to provide positive benefits in the treatment of certain fluid columns, prior art magnetic field generators are challenged by a number of deficiencies.

Permanent magnets typically generate magnetic flux via an array of rare earth magnets proximate the flow path of a fluid through a section of conduit. Because the strength of the magnetic field cannot be adjusted, the flow rate of a fluid as it passes through the fixed strength of the magnetic field generated by a permanent magnet is a primary factor in determining the effectiveness of the treatment provided by such units.

Desired treatment of a contaminated fluid column may occur when the flow rate of a fluid is matched to a specific sized array of fixed magnets with a nonadjustable magnetic field strength. However, when the velocity of a feedstock varies from the required flow rate through a specific permanent magnet configuration, desired treatment of the fluid column may not occur. Therefore, when the velocity of a fluid deviates from the rigid parameters of a specific flow rate through specific sized conduit having a ratio of conduit size to the length of a fixed magnetic field strength required to provide the conduction coefficients necessary for effective treatment, use of permanent magnets may result in lost efficiency, or a total lack of magnetic treatment.

Electromagnets may be formed by electrically charging a length of an electrical conducting material, such as a length of metal wire, to create an electromagnetic field that radiates from the circumference of the wire. Coiling an electrically charged wire allows the density of the magnetic flux produced by this configuration to concentrate at the center of the coil of wire.

Wrapping a strand of electrical conductor, such as a length of copper wire, around a conduit, such as section of pipe, and connecting each end of the electrical conductor to the positive terminal and the negative terminal of a supply of electrical power is a common method of making an electromagnet. A basic principal of electromagnetic generation states the strength of the magnetic field provided by a device is determined by multiplying on the number of turns of a coil of wire by the constant current, or amperage, supplied to the coil. This calculation of wire turns and amperage is commonly referred to as the amp-turns of the device. The gauss provided by an electromagnet is directly proportional to the number of amp-turns. The magnetic field generated by the electrically charged coil may be strengthened by increasing the number of turns of wire around a conduit, increasing the voltage and current supplied to the coil or increasing both the number of turns and the intensity of the electrical supply. The strength of an electromagnetic field may be increased or decreased by adjusting the amperage supplied to the coil of wire in applications where periodic variations of the magnetic flux may be desired to provide desired fluid treatment.

In addition to creating an electromagnetic field, this configuration of coiled electrically charged wire typically generates heat. Heat generation has been a major limitation in developing the maximum electromagnetic field strength of prior art electromagnet devices. For example, heat generated by an electrically charged wire increases resistance within the coil, resulting in a drop in the flow of current through the device and diminishing the amp-turn, or gauss, of the electromagnet.

Excessive heat generation typically leads to the failure of prior art electromagnet devices when heat retention within the coiled wire is sufficient to cause sections of the wire to melt and come in contact with each other. The resulting short circuit reduces the efficiency of the device due to fewer amp turns being in effect. Heat may also cause the coil of wire to completely part and create an open circuit in the continuous coil of wire so that no electromagnetic field is generated. Thus, the generation and retention of heat typically impedes the flow of electrical current through the wire coil of prior art electromagnet devices and makes them less effective, or totally useless, in fluid treatment until the continuity in the entire electrical circuit can be restored.

In some instances, a protective housing may be utilized to shield the coiled wire from cuts, abrasions or other damage. However, encasing coiled layers of wire within a protective housing typically promotes the retention of heat generated by the coil of electrically charged wire. To disperse heat generated by such devices, protective housings of many prior art electromagnetic field generators are typically filled with mineral oil, graphite or other materials to assist in the dissipation of the heat and to prolong the life of the device. The addition of oil or other heat dispersing materials adds a significant amount of weight to these electromagnetic field generators, making them difficult to handle and install. Further, the potential of oil or other heat dispersing materials leaking from such devices and contaminating the environment, along with other maintenance issues, poses additional problems for end users.

Heat dissipation is critical to the overall efficiency and effectiveness of electromagnetic filed generators. Heat generated by an internal layer of a wire coil contiguous with a conduit may radiate through the conduit and into a fluid flowing through it. Heat generated by the outer layer of the wire coil may dissipate into the atmosphere if the device is used in an open-air configuration or transferred through heat dispersing materials to the enclosure and then into the atmosphere if a device is encased within a protective housing. However, the inability of prior art devices to transfer and dissipate heat generated by their internal layers of wire coils typically results in heat related open circuits or short circuits. Thus, prior art devices are typically limited in the number of layers of coiled wire that may be utilized to produce an electromagnetic field generator due to the generation and retention of heat within the layers of wire.

SUMMARY OF THE INVENTION

The instant invention provides a method and apparatus for use in the extraction of deposits such as scale, corrosion, paraffin, asphaltene and other contaminants from within conduits utilized in the transmission of fluid columns wherein a feedstock may be directed to pass through an air-cooled electromagnetic field generator. By subjecting a feedstock to an intense magnetic field, substances such as silica, calcium carbonate, paraffin or asphaltenes tend to remain in suspension. The instant invention further provides improved fluid treatment in the separation of oil and water, thereby increasing the efficiency of oil/water separation equipment.

Absent magnetic treatment, many substances are typically absorbed into ions that collect as adhesive-like substances within a fluid column and form deposits along the surface of the internal boundary walls of conduits utilized to transport a fluid. While a magnetic field does not remove contaminants from a fluid column, organic and inorganic substances that may be dissolved and suspended within a fluid column, such as paraffin, asphaltene, silica or calcium, typically become non-adhesive and remain in suspension rather than form scale deposits. Inducing a similar charge to elements carried within a fluid column tends to decrease their incidence of surface contact, with the induced polarization resulting in similarly charged ions within a feedstock continuously repelling each other.

Treatment by the electromagnetic field generator of the instant invention typically results in components carried within a fluid column remaining in suspension and prevents their accumulation as deposits on inner surfaces of conduits and on equipment utilized to transfer a fluid through a system. In many instances, the induced polarization of substances within a fluid column results in the re-polarization of other substances within a piping system that may have previously settled and formed scale or other types of deposits. Re-polarization of scale and other deposits allows many substances to be suspended within a fluid column and restores flow through the piping system and its transmission equipment. In piping systems where chemical treatment may be used for scale prevention, electromagnet treatment may result in a substantial reduction, or total elimination, of chemical additives to the system. Therefore, magnetic treatment of fluid columns may be of benefit in the reduction and elimination of scale and other types of deposits within conduits and on equipment utilized to propel a fluid through a system.

Magnetic treatment may also be used to accelerate the separation of oil and water. Environmental regulations require entities generating contaminated fluid columns as part of a manufacturing process or an incidental spill or leak with the containment, treatment and elimination of pollutants from a fluid column prior to discharging a treated effluent into the environment. Numerous treatment systems are currently utilized to treat water run-off from facility operations, industrial wastewater, oilfield production water and water generated during remediation of contaminated soil. While a fundamental use of magnetic treatment has been to dislodge and eliminate scale and other deposits from a piping system, electromagnetic forces provided by the instant invention may be utilized to enhance the efficiency of oil/water separation equipment in removing free-floating oil.

By utilizing the instant invention to influence the forces creating the oil/water mixture and break oil/water emulsions prior to passing a hydrocarbon-contaminated feed stream through a separation device, hydrocarbon contaminants, such as oil, may precipitate and be removed from a previously stable suspension or emulsion.

This invention generally relates to the treatment of fluid columns with emphasis on the prevention of contaminant deposition and the removal of built-up deposits from within the interior walls of a conduit. While magnetic treatment of a feed stream typically accelerates oil/water separation, other contaminants, such as suspended solids, typically remain within a fluid column. If a fluid column requires additional remedial action prior to its discharge into the environment, a feed stream may be further treated to extract a variety of dissolved and suspended contaminants and provide an effluent suitable for discharge. One method of contaminant separation requires passing a fluid column through electrically charged electrodes to create a stable flocculate that can be filtered to remove contaminants from the feed stream. When used in concert, the synergy of the electromagnetic field generator of the instant invention and this contaminant separation method significantly enhance the performance of systems utilized to remove contaminants from fluid columns.

The electromagnetic field generator of the instant method may be formed by encircling a segment of a length of conduit defined by a fluid impervious boundary wall with an inner surface and an outer surface and having inlet and outlet ports, such as a section of pipe, with a continuous strand of an electrical conductor, such as copper wire, to form an initial layer of coiled wire. Once the required number of wire coils have been placed around a section of conduit to achieve the desired length of the internal layer of the continuous coil of wire, air-cooling ducts extending substantially parallel to the longitudinal axis of the conduit may be created by placing a pattern of spacers, such as fiberglass strips, on top of the first coil of wire, the spacers being arranged substantially parallel to the longitudinal axis of the conduit and equidistant from one another. The spacers are typically of a length identical to that of the initial layer of coiled wire wrapped around the conduit.

A second layer of the continuous wire coil may then be wrapped around the outer facing surface of the spacers resting atop the first layer of the wire coil so that the pattern of spacers separates the coaxially disposed, radially spaced layers of the continuous wire coil and forms a system of open-air cooling ducts between the layers of the coiled wire. Additional layers of the continuous coil of wire, spacers or both may be added to achieve the desired configuration of a device.

In the preferred embodiment of the instant invention, the continuous wire coil is formed by encircling a segment of a length of conduit with layers of an electrical conductor, said electrical conductor comprising a continuous strand of an electrical conducting material having a first conductor lead and a second conductor lead, with each turn of the continuous strand of electrical conductor being contiguous with the adjacent turn of electrical conductor. While an uninterrupted layer of coiled wire is preferred, mechanical winding of an electrical conducting material may result in small gaps or openings between adjacent turns of the continuous wire coil. Such gaps serve no beneficial purpose and may in fact result in so-called hot spots within the continuous coil of wire and impede its performance. Uninterrupted layers of a continuously coiled electrical conducting material, with each turn of the electrical conducting material being contiguous with its adjacent turn, provide the most efficient means of generating the electromagnetic field of the instant invention.

The electromagnetic field strength provided by the instant invention may be increased by concentrating the magnetic flux of each layer of coiled wire as near the center of the conduit as possible. Once the desired length of a continuous wire coil has been wound contiguous with the outer wall of the conduit, a second layer of the continuous wire coil having a similar length to the initial layer may be placed atop the first coil of wire. A pattern of spacers may be placed atop the second layer of the coil of wire in a substantially parallel orientation to the longitudinal axis of the conduit, with a third layer of wire placed on top of the outer facing surface of the spacers. The addition of the third layer of the continuous wire coil encircling the pattern of spacers forms a system of open-air cooling ducts substantially parallel to the longitudinal axis of the conduit. Subsequent layers of spacers and wire coils may be added to provide additional layers of coaxially disposed, radially spaced wire coils and open-air ducts.

In many instances it may be advantageous to include a thin sheet of a non-conductive material, such as a synthetic film commonly available under the trade name of Nomex, to separate adjacent layers of the continuous wire coil and enhance the mechanical stability of the coiled wire winding. A layer of Nomex may also be placed between a layer of coiled wire and the spacers utilized to form the open-air ducts. Additional mechanical stability may further be provided by adding an outer layer of a structural stabilizing material, such as fiberglass, to the final configuration of layered wire, stabilizing material and spacers surrounding the conduit. This arrangement results in coaxially disposed, uninterrupted layers of a continuous coil of wire radially spaced apart from one another by a pattern of spacers and provides for cooling of all layers of the wire coil by promoting air passage through a system of open-air cooling ducts that transfer heat generated by the electrically charged wire to the atmosphere.

To generate an electromagnetic field, a first conductor lead of the continuous coil of wire may be connected to the positive terminal of a power supply and a second conductor lead of the continuous wire coil may be connected to the negative terminal of the power supply. When voltage and current are applied to the continuous coil of wire, the electromagnetic field generated by the energized wire is concentrated within the inner surface of the fluid impervious boundary wall of the conduit so that a fluid column directed to flow through the conduit may receive electromagnetic treatment as it passes through the device.

Heat generated by the electrically charged wire coils of the instant invention is transferred to the air within the ducts. When utilized in a vertical orientation, hot air within the ducts rises through the cavities created by the pattern of spacers disposed between the layers of wire and to the openings between the layers of wire at the top of the electromagnetic unit where it then dissipates into the atmosphere. Cooler ambient air is drawn into the ducts at the bottom of the unit to replace the rising hot air, creating a chimney effect that provides for the continuous flow of air through the device and facilitates the transfer of heat from the wire coil to the air within the ducts and then into the atmosphere. Reducing heat within the coil of wire, which in turn reduces resistance within the coil, allows more current to flow through the electromagnetic field generator of the instant invention. Therefore, increasing the amount of current flowing through the wire coil results in an increase in the number of amp-turns of the device. The equation $I=V/R$ demonstrates this. In any fractional equation, decreasing the denominator while the numerator remains constant results in an increase in the quotient. In the equation $I=V/R$, I represent electrical current, V represents voltage and R represents resistance. By reducing heat retention, and therefore resistance, within the continuous coil of wire while the voltage remains constant, the resulting increase in current provides for increased amp-turns, and therefore gauss strength, of the unit.

The system of air-cooling ducts that provides a means of dissipating heat generated by the coaxially disposed, radially spaced layers of coiled wire allows additional layers of wire to be incorporated in the device, resulting in increased amp-turns. The transfer of heat from the wire coil to the atmosphere via the chimney effect of air flowing through the system of open-air channels reduces resistance within the device. Reduced resistance allows more current to flow through the unit and results in increased amp-turns of the device. Thus, an electromagnetic field generator having a series of open-air ducts between its layers of wire will produce greater gauss strength than a similarly configured device lacking air-cooling ducts due to the reduced resistance within the coil of wire of the air-cooled unit allowing increased current to drive the unit.

A number of variables may be used to optimize such units. For example, the size and shape of the wire used to form the wire winding that encircles a segment of the conduit, the proximity of each successive wrap of wire to the adjacent wrap of wire forming the continuous wire winding, the length of the winding along the surface of the conduit and the number of layers of wire windings forming the electromagnetic field generator of the instant invention determine the total number of windings of the device.

These factors, along with output capacity of the power supply utilized to provide the desired amount of current through the continuous wire coil determine the total amp-turns, and consequently the gauss strength, of the device. Other variables include the size, shape and composition of the materials comprising the various components of the device, such as the conduit, the spacers and the protective housing, if included.

While many types of materials may be utilized to provide an enclosure for the electromagnetic field generator of the instant invention, non-magnetic, non-corrosive materials, such as aluminum, that possess heat transfer properties are preferred to shelter the layered coils of wire from cuts, abrasions, dents, exposure to ultraviolet sunlight or other types of damage that may otherwise affect the structural integrity of the device or impair its performance. The magnetic field generator may be sealed within a solid-bodied enclosure or the housing may include a pattern of perforations that allow for flow-through ventilation of the unit. When a device is enclosed within a solid-bodied housing and mounted in a vertical orientation, the convection of the air within the housing and its constant contact with the enclosure provides for the transfer and dissipation of the heat generated by the coaxially disposed, radially spaced layers of electrically charged wire. Heat transferred to the air rising through the system of open-air cooling ducts between the layers of wire is transferred to the body of the enclosure as the hot air contacts the upper end of the housing. Cooler air at the bottom of the enclosure is then drawn into the ducts to replace the rising hot air. This convection of the air confined within the enclosure and circulating through the open-air ducts transfers heat from the continuous coil of wire to the enclosure where it may then radiate from the protective housing and dissipate into the atmosphere.

The electromagnetic field generator of the instant invention provides an air-cooled, environmentally friendly device capable of inducing a similar ionic charge to dissolved and suspended substances within a fluid column to cause contaminants within a fluid column to become non-adhesive and inhibit their accumulation as deposits within conduits and on surfaces of equipment utilized in the transmission of the fluid. The electromagnetic field generator of the instant invention may also be utilized to break oil/water emulsions and improve the efficiency of oil/water separation equipment and eliminate biological contaminants, such as bacteria. When compared to prior art devices, the electromagnetic field generator of the instant invention weighs less, generates less heat, requires less electrical current and generates a greater gauss strength than similarly sized prior art devices.

BRIEF DESCRIPTION OF THE DRAWINGS

The accompanying drawings illustrate the preferred embodiments of the invention in which.

DESCRIPTION OF THE PREFERRED EMBODIMENT

Figure 1:
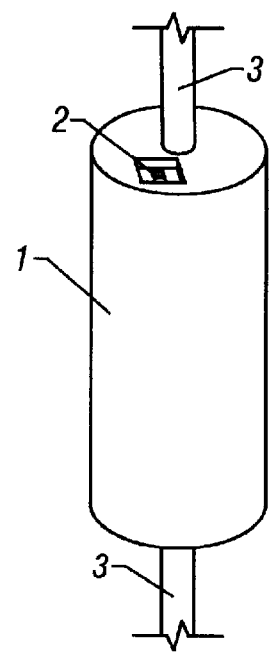
FIG. 1 illustrates an electromagnetic field generator within a cylindrical housing.

FIG. 1 shows conduit 3 extending through each end of a cylindrical housing 1 utilized to protect a coaxially disposed, radially spaced array of a continuous wire coil and spacers encircling a segment of the conduit. A housing typically comprises a tubular member having a pair of end plates affixed to conduit 3. Junction box 2 shown at one end of housing 1 allows a source of electrical power to be connected to the electrical conductor forming the continuous coil of wire of the device.

Figure 2:
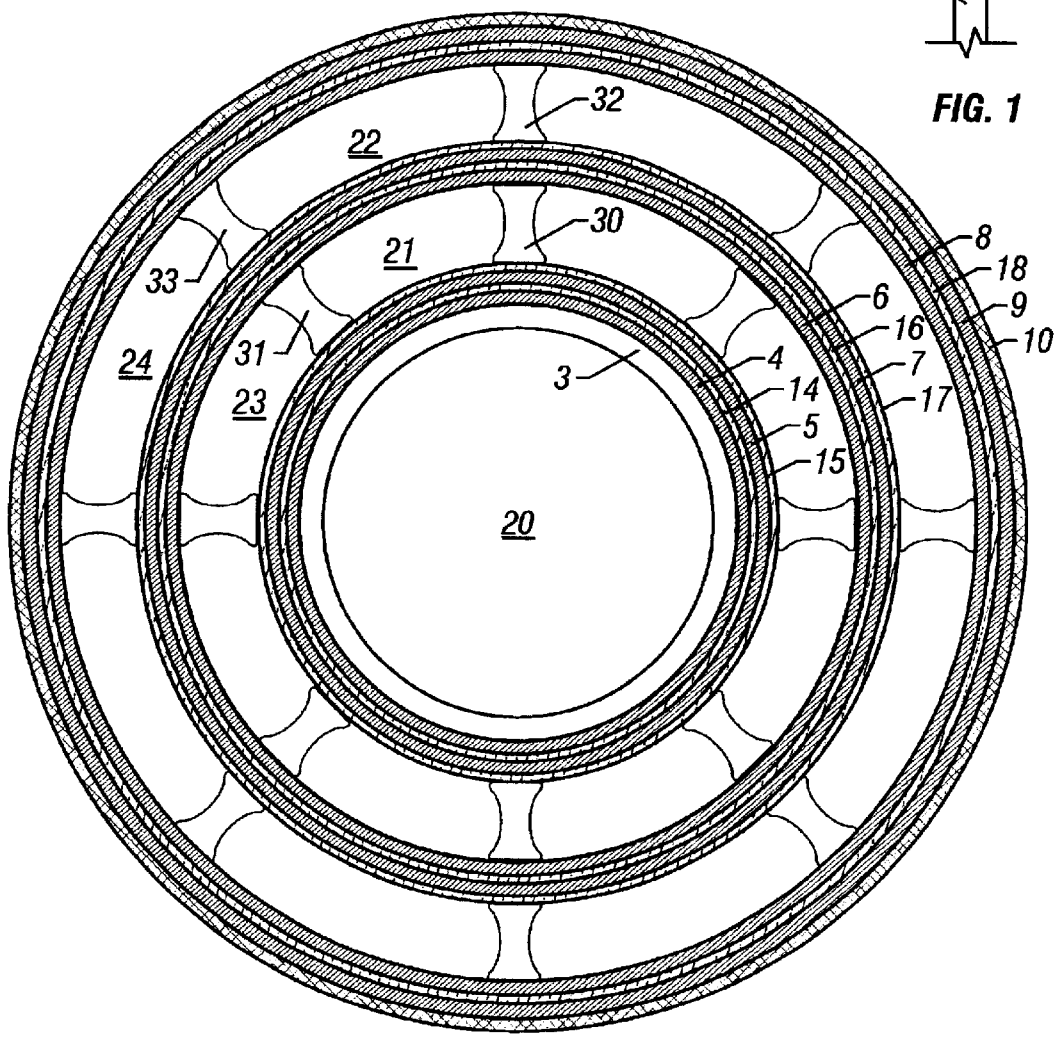
FIG. 2 shows a cross-sectional view of the electromagnetic field generator.

FIG. 2 depicts a cross-section of the electromagnetic field generator of the instant invention and will be described from the center of the drawing to the outer edge of the figure. A fluid column may pass through aperture 20 formed by the inner surface of the fluid impervious boundary wall of conduit 3. A continuous coil of stranded electrical conducting material is shown contiguous with and encircling a segment of the outer surface of the fluid impervious boundary wall of conduit 3 to form initial layer 4 of coiled wire. A layer of non-conductive stabilizing material 14 is shown placed adjacent to and encircling the initial layer of coiled wire 4. Non-conductive stabilizer layer 14 may typically be of a length identical to that of layer 4 of the continuous coil of wire.

A second layer 5 of the continuous coil of wire is shown contiguous with and encircling stabilizer layer 14. Layer 15 of non-conductive stabilizing material is shown contiguous with and surrounding layer 5 of the continuous wire coil.

Open-air ducts 21 and 23 extending substantially parallel to the longitudinal axis of the conduit are members of an open-air cooling system formed by placing a pattern of spacers, such as spacing materials 30 and 31, atop stabilizer layer 15, then winding a third layer 6 of the continuous wire coil around the outer facing surface of the spacers. Spacers are typically of an identical length to that of the wire coils and arranged substantially parallel to the longitudinal axis of the conduit and equidistant from one another to form a uniform pattern of open-air ducts.

Layers 6 and 7 of the continuous wire coil and stabilizer layers 16 and 17 are shown between inner air-cooling ducts 21 and 23 and outer air-cooling ducts 22 and 24. Spacers 32 and 33 are members of an outer pattern of spacers resting atop stabilizer layer 17. Layer 8 of the continuous wire coil wrapped around the outer facing surface of the outer pattern of spacers forms outer air-cooling ducts 22 and 24. Coaxially disposed stabilizer layer 18 and layer 9 of the continuous wire coil are also shown. An outer layer 10 of a structural stabilizing material, such as fiberglass, may be included to provide additional mechanical stability to the coaxially disposed, radially spaced configuration of the continuously coiled wire, stabilizers and spacers surrounding the conduit. The final assembly may be coated with epoxy or other adhesives to bond the components and provide additional structural stability to the device.

The resulting configuration of components of the preferred embodiment of the electromagnetic field generator of the instant invention results in layers 4, 5, 6, 7, 8, and 9 of a continuous coil of wire being coaxially disposed with structural stabilizing layers 14, 15, 16, 17, 18 and 10 and radially spaced apart by a pattern of spacing materials that includes spacers 30, 31, 32 and 33 in concentric surrounding relation to conduit 3 at the center of the device. Spacers 30 and 31 are part of a pattern of spacing materials arranged substantially parallel to the longitudinal axis of the conduit and sandwiched between non-conductive stabilizer layer 15 and layer 6 of the continuous wire coil that form an inner system of open-air ducts that includes cooling ducts 21 and 23. Outer air-cooling ducts 22 and 24 are formed by placing spacers 32 and 33 between stabilizer layer 17 and continuous wire coil layer 8. This coaxially disposed, radially spaced array of components provides a cooling system for the continuous wire coil by allowing air to pass through the open-air ducts created by the spacers, thereby transferring heat generated by the internal layers of the continuous coil of wire to the atmosphere.

Figure 3:
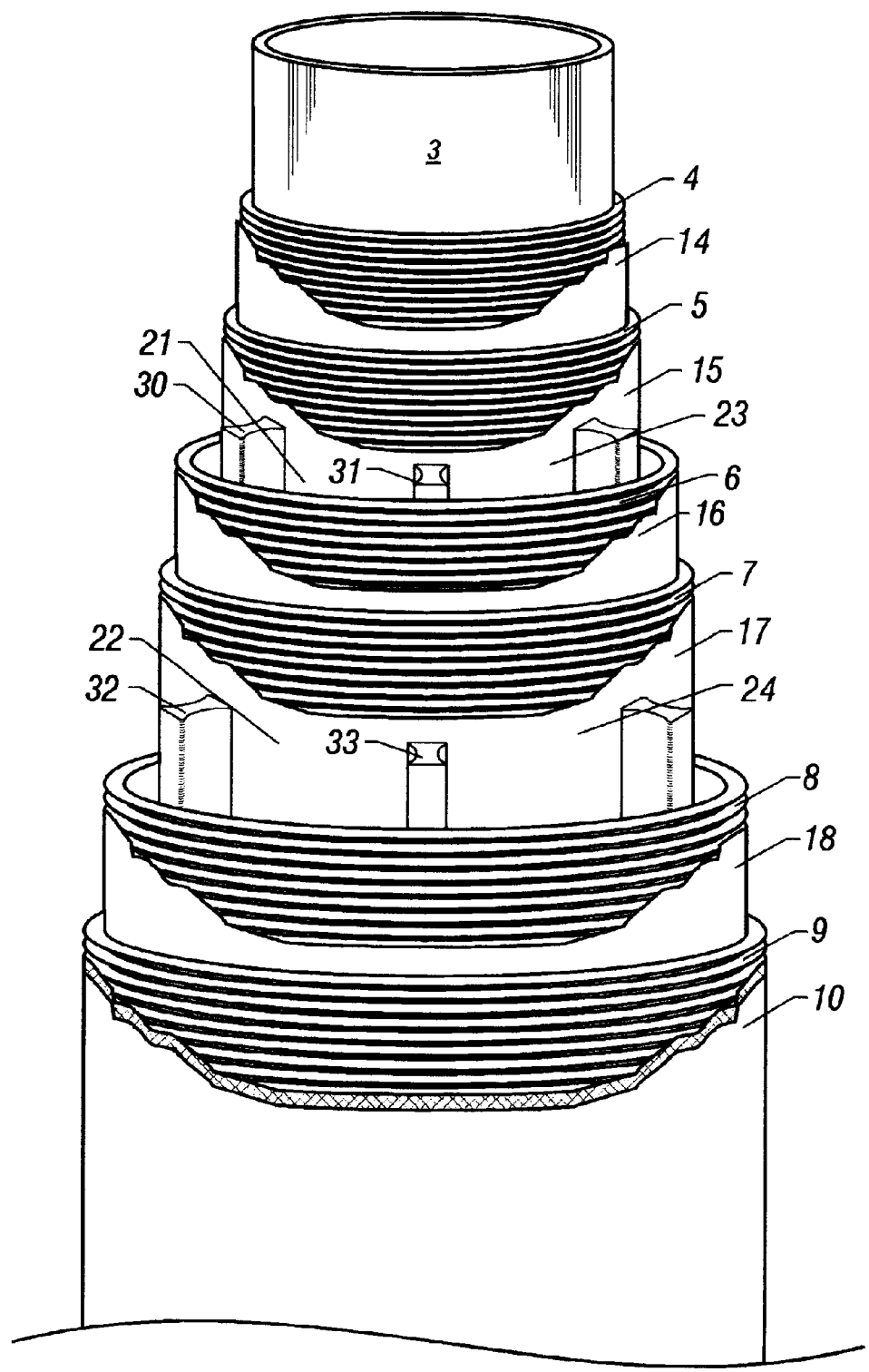
FIG. 3 is a cut-away illustration of the coaxially disposed and radially spaced layers of a continuous wire coil, spacers, and insulating material around a conduit.

FIG. 3 illustrates the coaxially disposed configuration of the components comprising the electromagnetic field generator of the instant invention. Layer 4 of the continuous coil of wire is shown contiguous with and encircling the outer surface of the fluid impervious boundary wall of conduit 3 at the center of the device. Stabilizer layer 14 is shown contiguous with and surrounding wire coil 4, with wire coil 5 contiguous with and encircling stabilizer layer 14 and stabilizer layer 15 contiguous with and surrounding coiled wire layer 5. Inner air-cooling ducts 21 and 23 are formed by spacers 30 and 31 arranged substantially parallel to the longitudinal axis of the conduit and sandwiched between non-conductive stabilizer layer 15 and layer 6 of the continuous coil of wire. Coiled wire layer 6 is shown coaxially disposed and spaced apart from stabilizer layer 15 in concentric surrounding relation to conduit 3 at the center of the device. Stabilizer layer 16 is shown contiguous with and surrounding coiled wire layer 6 with layer 7 of the wire coil surrounding stabilizer layer 16. Non-conductive stabilizing material layer 17 is shown contiguous with and surrounding coiled wire layer 7.

Outer air-cooling ducts 22 and 24 are formed by spacers 32 and 33 placed substantially parallel to the longitudinal axis of the conduit and sandwiched between non-conductive stabilizer layer 17 and wire coil layer 8. Layer 8 of the continuous coil of wire is shown coaxially disposed and radially spaced apart from stabilizer layer 17 in concentric surrounding relation to conduit 3 at the center of the device. Non-conductive stabilizer layer 18 is shown between and contiguous with layer 8 and layer 9 of the continuous coil of wire. Layer 10 is shown contiguous with and surrounding layer 9 of the continuous coil of wire and may typically be comprised of fiberglass or another non-conductive material to provide additional mechanical stability to the coaxially disposed, radially spaced components comprising the instant invention.

Figure 4:
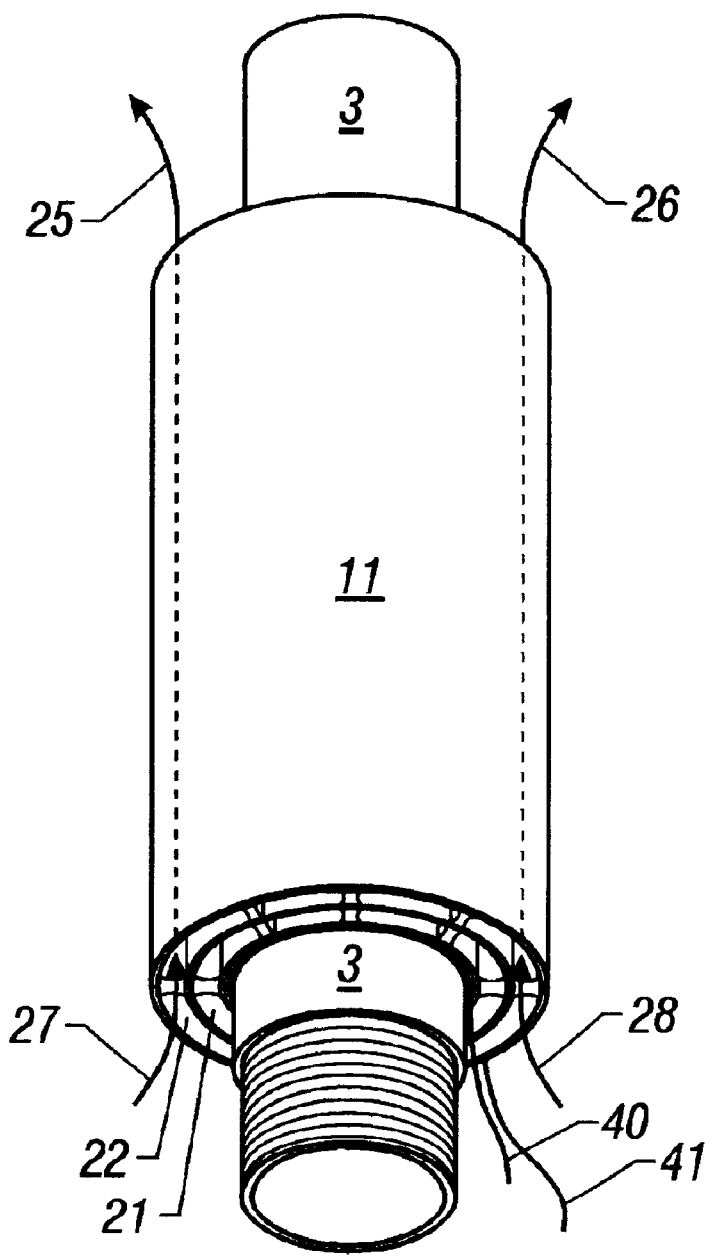
FIG. 4 illustrates the flow of air through the electromagnetic field generator.

FIG. 4 illustrates the chimney effect utilized by the electromagnetic field generator of the instant invention to transfer heat from the internal layers of the continuous wire coil to the atmosphere when the instant invention is vertically aligned in a piping system. One end of the electrical conducting material comprising the continuous coil of wire of electromagnetic field generator 11 serves as a first conductor lead 40 and may be connected to the positive terminal of a power supply while the opposite end of the electrical conducting material serves as a second conductor lead 41 and may be connected to the negative terminal of the power supply to complete the circuit. When voltage and current from a power supply are applied to the continuous coil of wire, fluids flowing through conduit 3 extending through the continuous coil of wire of electromagnetic field generator 11 may be exposed to electromagnet treatment.

A system of cavities extending substantially parallel to the longitudinal axis of the conduit created by a pattern of spacers disposed between the layers of the continuous coil of wire provide a means of removing heat from the internal layers of the coiled wire by promoting the flow of air through the system of open-air cooling ducts. Heat generated by the electrically charged wire radiates into the air within the adjacent system of open-air cooling ducts 21 and 22, allowing the heated air to naturally rise within the system of open-air cooling ducts. The heated air 25 and 26 then dissipates into the atmosphere as it exits the openings of the open-air cooling ducts at the top of the device. Cooler ambient air 27 and 28 is then drawn into the openings of the cooling ducts near the bottom of the device to replace the rising hot air. The resulting chimney effect of air flowing through the system of open-air cooling ducts effectively transfers heat radiating from the continuous coil of wire to air in the ducts and then into the atmosphere. This continuous dissipation of heat reduces resistance within the continuous coil of wire. Reduced heat retention, and therefore resistance, allows more current to continuously flow through the coil of wire. The result is an increase in the amp-turns, and therefore the gauss strength, of the device.

In some instances it may be desirable to enclose the electromagnetic field generator within a protective housing to shelter it from cuts, prolonged exposure to ultraviolet sunlight or other damage that may affect the structural integrity of the device or impair its performance. A protective housing may include a pattern of perforations to allow for the flow-through ventilation of the unit and include a fan to promote the flow of air through the wire coils or the electromagnetic field generator of the instant invention may be sealed within a solid-bodied enclosure.

Figure 5:
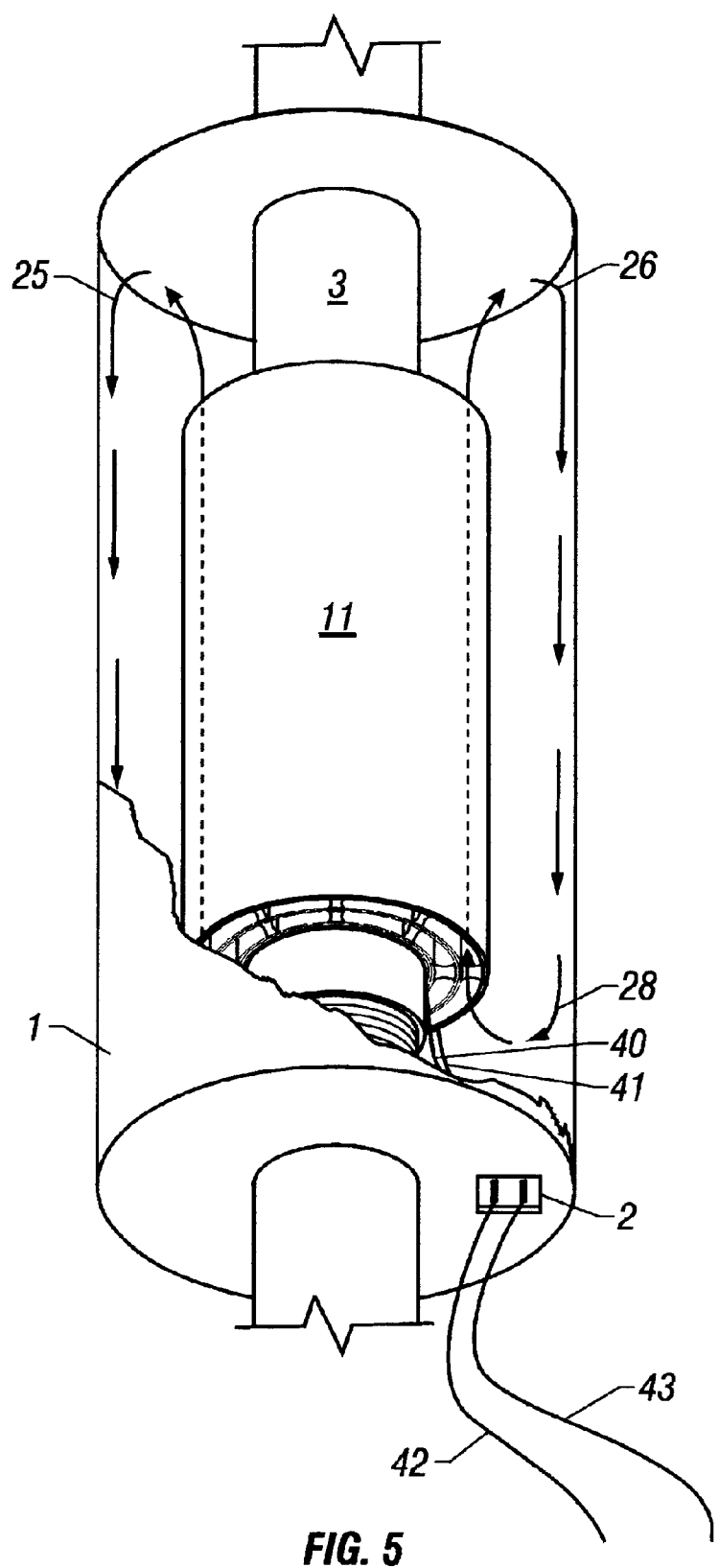
FIG. 5 shows the flow of air between coaxially disposed, radially spaced layers of wire of an electromagnetic field generator within a cylindrical housing.

FIG. 5 shows electromagnetic field generator 11 enclosed within a solid-bodied cylindrical housing 1 formed by a tubular member having a pair of end plates affixed to the conduit. Electrical power leads 42 and 43 provide voltage and current to drive the device and are shown connected to junction box 2 at the bottom of cylindrical housing 1. Junction box 2 provides connection points for first conductor lead 40 and second conductor lead 41 of the continuous wire coil of electromagnetic field generator 11 to electrical power supply leads 42 and 43. Conduit 3 is shown extending through the body of the electromagnetic field generator 11 and protective housing 1. Heat generated by the innermost layer of the continuous coil of wire of electromagnetic field generator 11 contiguous with a segment of conduit 3 typically radiates through the conduit and into the feed stream flowing through the conduit. Within a solid-bodied housing, the convection of air flowing through the system of open-air cooling ducts and its constant contact with internal walls the enclosure provides for the transfer of heat generated by the coaxially disposed, radially spaced layers of electrically charged wire to the body of the enclosure and its dissipation into the atmosphere.

Heated air 25 and 26 rising to the top of electromagnetic field generator 11 through the system of open-air cooling ducts extending substantially parallel to the longitudinal axis of the conduit is transferred to the body of enclosure 1 as the rising air contacts the upper end of the housing. Cooler air 28 at the bottom of enclosure 1 may be drawn through the system of open-air cooling ducts at the bottom of electromagnetic field generator 11 to replace the rising hot air. This chimney effect provides for the convection of air confined within the enclosure, allowing the air to circulate through the system of open-air cooling ducts of electromagnetic field generator 11 and transfer heat from its charged wire coil to enclosure 1 where it may then radiate into the atmosphere.

The magnetic flux loop generated by the electromagnetic field generator of the instant invention flows from one end of the coaxially disposed, radially spaced layers of the continuous wire coil, around the periphery of the continuous wire coil and returns to the other end of the continuous wire coil.

Housings formed with materials having a high magnetic permeability provide a path for the electromagnetic field generated by the continuous coil of wire of the instant invention and prevent stray magnetic fields outside the housing. The use of a magnetic material, such as carbon steel, to form an enclosure for the electromagnetic field generator of the instant invention typically results in the magnetic flux generated by the device being captured within the magnetically conductive housing.

The path of the magnetic field is typically limited to the area within a housing comprised of a magnetically permeable material and little, if any, gauss may be measured at the orifice of the conduit at either end of the device. Fluid flowing through the conduit of a device enclosed within a magnetically permeable housing is typically limited to magnetic treatment within that section of conduit enclosed within the magnetically permeable housing. For example, fluid flowing through an electromagnetic field generator utilizing a conduit comprised of a magnetic material enclosed within a housing comprised of a magnetically permeable material may be exposed to 400 gauss of magnetic treatment as it passes through the coaxially disposed, radially spaced continuous coil of wire within the housing.

However, other materials may be utilized to form protective housings. In certain instances, it may be advantageous to utilize a material having a high coefficient of thermal conductivity and low relative magnetic permeability, such as aluminum, to form an enclosure for the electromagnetic field generator of the instant invention. Non-magnetic materials, such as aluminum, may be used to form an enclosure for a device utilizing a conduit comprised of a magnetic material, such as carbon steel. This configuration of components allows the magnetic flux loop generated by the electromagnetic field generator of the instant invention to flow from one end of the conduit, around the periphery of the continuous coil of wire and return to the other end of the conduit.

This utilization of non-magnetic materials to form the enclosure and pipe couplings provides a fluid column with exposure to magnetic treatment not only as it passes through the continuous coil of wire, but also provides magnetic treatment at the orifice at each end of the conduit due to the flow of the magnetic flux loop from one end of the magnetically conductive conduit, around the periphery of the continuous coil of wire and returning to the other end of the conduit. Because the enclosure is non-magnetic, the magnetic flux is not captured, absorbed or contained within the housing and the magnetic flux loop is therefore free to flow as if through air. Such a configuration of materials typically provides for increased magnetic treatment at multiple points. In many instances, the gauss measured at the opening at either end of a conduit comprised of magnetic material enclosed within a non-magnetic housing may be sufficient to provide magnetic treatment at multiple points as a fluid flows through the conduit.

For example, fluid flowing through an electromagnetic field generator utilizing a conduit comprised of a magnetic material enclosed within a non-magnetic housing may be exposed to 400 gauss of magnetic treatment as it passes through the conduit surrounded by the coaxially disposed, radially spaced continuous coil of wire within the housing. However, the fluid may additionally be exposed to approximately 200 gauss of magnetic flux as passes through the inlet orifice of the conduit and further exposed to approximately 200 gauss of magnetic flux as it passes through the outlet orifice of the conduit. Thus, a fluid column may receive approximately twice the amount of magnetic treatment with this configuration as that provided by a similar device enclosed within a magnetically permeable housing.

Many prior art devices, such as permanent magnets, are typically comprised of a fixed array of rare earth magnets within a section of conduit. Installation of such devices typically requires suspension of flow through a fluid transmission conduit and draining the conduit to facilitate removal of a section of pipe to accommodate the permanent magnet device. In contrast, the electromagnetic field generator of the instant invention may be installed as a non-invasive device contiguous with the exterior wall of a fluid transmission conduit already in service without interrupting the continuous flow of fluid through the piping system.

While the description of the preferred embodiment includes references to a continuous coil of wire in a plurality of layers, at times it may be advantageous to utilize shorter, easier to handle lengths of wire to form each layer of the wire coil. For example, installation of the instant invention on an existing section of six-inch diameter pipeline already being utilized in the continuous transmission of a fluid column may require 1,920 feet of 12-gauge wire to be configured as six layers of coaxially disposed, radially spaced coiled wire along a thirty-six inch length of the pipeline.

Field installation of such a device may be greatly simplified by utilizing six short, easy to handle spools of wire, rather than one large spool of wire, to form the six layers of coiled wire. Each spool of wire provides an electrical conductor comprised of a continuous strand of an electrical conducting material, such as 12-gauge insulated copper wire, having a first conductor lead at one end of the strand of wire and a second conductor lead at the opposite end of the strand of wire. The six individual layers of electrical conductor are coiled around a segment of the pipeline and coaxially disposed and radially spaced apart from one another by a pattern of spacers between each layer of wire. The conductor leads at each end of the coiled layers of electrical conductor may then be coupled in series to achieve electrical continuity throughout the layers of wire coils and allow the six independently wound layers of wire to function as a single electrical conductor. The first and second conductor leads of the consolidate layers of wire forming the now continuous coil of wire encircling a segment of the conduit may be connected to a power supply to allow current to flow through the coil and generate a magnetic field.

In this example, a properly configured and installed embodiment of the instant invention utilizes six individual layers of 12-gauge wire extending thirty-six inches along a segment of pipeline. The individual layers of wire coils are connected in series to provide continuity throughout layers of wire so the now consolidated wire coil may be connected to an electrical power supply to energize the 1,920 feet of 12-gauge wire forming the six layers of coiled wire so that fluids passing through the pipeline may then be exposed to electromagnet treatment.

In some applications, it may be advantageous to couple the six individual first conductor leads at one end of the coaxially disposed array of radially spaced layers of wire to a first terminal of a power supply. The six individual second conductor leads at the opposite end of the coaxially disposed array of wire layers may then be coupled to a second terminal of the power supply. The resulting configuration of six coaxially disposed, radially spaced coiled electrical conductors connected in parallel may then provide fluids passing through the pipeline with exposure to electromagnet treatment.

The electromagnetic field generator of the instant invention may be utilized to treat a wide variety of fluid columns to reduce the adhesive qualities of many of the components in a feedstock. In oilfield applications, electromagnetic fluid treatment may be applied at the wellhead to reduce scale, paraffin and asphaltene deposits within the production piping system. Similar reductions in deposits may also be realized when treating larger transmission pipelines. In large collection tank batteries, treatment provided by the electromagnetic field generator of the instant invention may be used to reduce high tank bottoms, a term used to describe the accumulation of sediment within storage tanks that reduces the storage capacity of such vessels.

The generation of heat by the instant invention may be advantageously applied in certain petroleum production applications. It is commonly known the introduction of heat at the production interval of oil well operations provides a number of benefits, including a reduction in the viscosity of heavy oils and an increase in their mobility that allows them to flow more readily through a formation and into a downhole wellbore. The instant invention may be configured to fit within a wellbore for use in downhole oilfield production applications.

The electromagnetic field generator of the instant invention may be placed downhole proximate a section of a wellbore having a pattern of perforations that allows petroleum within the surrounding formation to migrate into the wellbore. The electromagnetic field generator of the instant invention may also be utilized in concert with other types of downhole heating apparatus.

Figure 6:
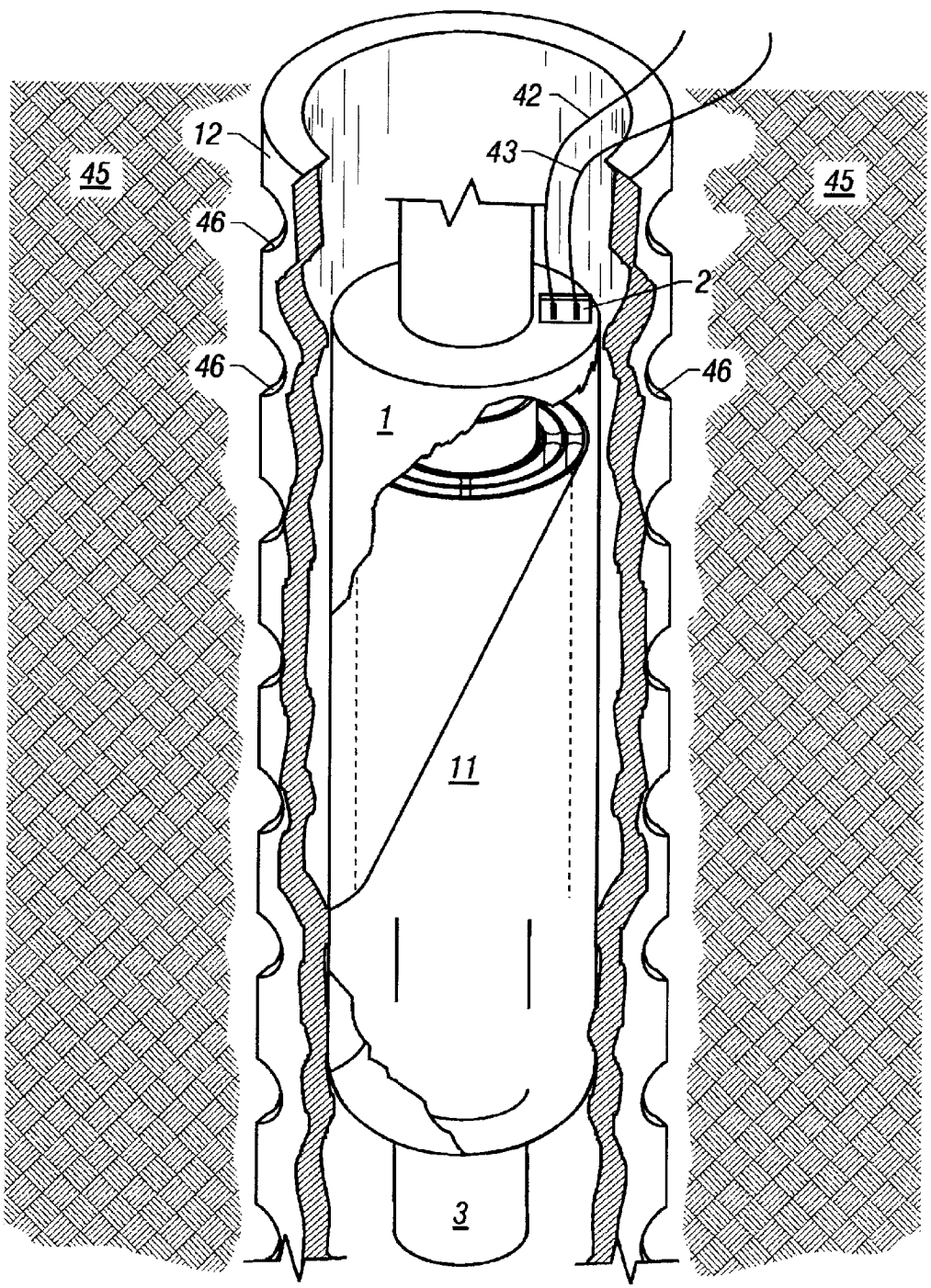
FIG. 6 is a cut-away illustration of the electromagnetic field generator of the instant invention within the wellbore of a petroleum production well.

FIG. 6 shows electromagnetic field generator 11 enclosed within a solid-bodied cylindrical housing 1 within wellbore 12. Electrical leads 42 and 43 provide voltage and current to drive the device and are shown connected to junction box 2 at the top of the cylindrical housing 1. Conduit 3 is shown to extend through the body of the electromagnetic field generator and protective housing 1.

Heat generated by the continuous coil of wire of electromagnetic field generator 11 may be transferred to the body of enclosure 1 where it may then radiate into the surrounding formation 45. Heat generated by the instant invention allows petroleum and other fluids within the surrounding formation 45 to migrate more freely through the formation and into the wellbore via a pattern of perforations 46. Petroleum entering the wellbore may then be pumped to the surface for collection.

In instances where an electric submersible pump may be utilized, the device may be powered by the same power source as the pump. In other applications, the power supply for the instant invention may be located on the surface near the wellhead, with power leads run downhole to provide the required voltage and current to drive the device. Utilizing the instant invention in this manner allows heat generated by the device to enhance migration of petroleum through the surrounding formation while also providing magnetic conditioning of the fluid entering the wellbore to improve its flow through the piping system.

The transfer of heat from the electromagnetic field generator of the instant invention to the near-wellbore formation further serves to improve the efficiency of pumps and other fluid lifting apparatus. Downhole electromagnetic treatment further assists in petroleum fluid processing by causing components within a fluid column, such as paraffin and ashaltene, to become non-adhesive and inhibit their accumulation as deposits within the walls of production tubing and on equipment utilized in the transfer of the production fluid.

Electromagnetic treatment may also be utilized in conditioning water. For example, installation an electromagnetic field generator on the main water supply line of a residence prevents the formation of scale deposits within the piping system of the home. The effects of electromagnetic treatment in reducing scale deposits are especially recognizable in home appliances utilized in heat exchange applications such as water heaters, washing machines, dishwashers and coffee makers.

In regions having hard water supplies, a term used to describe water having a relatively high mineral content, utilization of the instant invention provides for a significant reduction in the surface tension of the water column. Reduced surface tension typically results in smaller amounts of soaps and detergents being required to obtain the same cleaning results that are achieved with untreated hard water.

Similar benefits may be realized in larger commercial applications of heat exchange equipment. In cooling towers, boilers and other types of heat exchangers, scale deposits within the walls the piping systems and on other components of heat transfer equipment form an insulating barrier that tends to inhibit the transfer of heat carried by water flowing through such systems. Scale deposits not only adversely affect the efficiency of these devices but also result in restricted flow and increased energy consumption in such heat exchange systems. In applications that require a water column to constantly circulate through a piping system, electromagnetic water treatment may be used to prevent the formation of scale deposits within the system. Further, the residual effects of magnetic water treatment typically cause existing scale deposits within a piping system to soften and disperse into a water column where the scale material may then be extracted by filtration or other separation methods.

While the utilization of chemical treatment has long been practiced to eliminate biological contaminants such as algae and bacteria in heat exchange systems, utilization of magnetic treatment to eradicate such contaminants is relatively new. Electromagnetic forces provided by the instant invention alter the functions of the cell membranes of organisms and typically cause the membranes and cell walls of biological contaminants to collapse, providing an efficient means of biological contaminant destruction.

Many biological contaminants regulate their water intake through osmosis via the electrical charge of fats and proteins in their surface membranes. Exposing feedstocks containing biological contaminants to concentrated magnetic fields drives the surface membranes of many biological contaminants to an imbalanced state by overwhelming the electrical field and the charge of the organism, thereby collapsing the cell walls and destroying the membranes. Utilization of the instant invention may be of particular utility in the destruction and elimination of many microorganisms because, unlike chemical treatment and many other means of dealing with such contaminants, bacteria and other organisms cannot develop immunity to such treatment.

While a fundamental use of magnetic treatment may be to loosen and eliminate scale and other deposits from a piping system, the instant invention may be utilized to overcome the forces that cause emulsions and accelerate the separation of oil and water. Oil, having a lower specific gravity, typically floats on water. However, mechanical agitation may shear the interface of distinct layers of oil and water so that small oil droplets become dispersed in the water. These small oil droplets tend to coalesce, form larger droplets and eventually float out of suspension. However, when exposed to surfactants, a thin molecular coating of the surfactant is typically adsorbed onto the surfaces of the oil droplets, causing the oil droplets to polarize and repel each other.

These small oil droplets remain suspended within the water and result in a substantial surface area of oil being dispersed within a water column and increase the tendency of the oil to form a stable emulsion. Under the influence of treatment provided by the electromagnetic field generator of the instant invention, forces bonding the surfactant ions to the surface of the oil droplets that provide the oil droplet with repelling surface charges are reduced. Diminishing the electrostatic charges on the surface of the oil droplets allows previously stable emulsions to break so that the small oil droplets are free to coalesce into larger droplets and float out of the water column. The free-floating oil may then be removed by conventional oil/water separation equipment. Thus, the instant invention provides a safe, simple, chemical-free pretreatment method to enhance the efficiency of oil/water separation devices.

The foregoing description of the preferred embodiment has been for the purpose of explanation and illustration. It will be appreciated by those skilled in the art that modifications and changes may be made without departing from the essence and scope of the present invention. Therefore, it is contemplated that the appended claims will cover any modifications or embodiments that fall within the scope of the invention.

What is claimed is:

1. A method of removing contaminants from a fluid column, comprising the steps of:

providing a length of conduit defining a fluid impervious boundary wall with an inner surface and an outer surface and having inlet and outlet ports;

providing a length of an electrical conductor, said electrical conductor having a first conductor lead and a second conductor lead;

providing a plurality of spacers;

coiling the electrical conductor around the outer surface of a segment of the conduit, each turn of the electrical conductor being contiguous with the adjacent turn of the electrical conductor to form a first electrical conductor coil layer encircling the conduit;

placing the spacers on the outer surface of the first electrical conductor coil layer, each spacer being arranged substantially parallel to the longitudinal axis of the conduit and equidistant to an adjacent spacer to form a pattern of open-air cooling ducts extending substantially parallel to the longitudinal axis of the conduit;

coiling the electrical conductor around the spacers to form a second electrical conductor coil layer, each turn of the electrical conductor being contiguous with the adjacent turn of the electrical conductor, said second electrical conductor coil layer being disposed coaxially and radially spaced apart from the first electrical conductor coil layer by the spacers and wherein the plurality of open-air cooling ducts are sandwiched between the first electrical conductor coil layer and the second electrical conductor coil layer;

connecting the first and second conductor leads of the electrical conductor to an electrical power supply to produce an electromagnetic field within the inner surface of the fluid impervious boundary wall of the conduit;

introducing a feed stream of contaminants carried within a fluid column to the inlet port of the conduit to establish a flow of the fluid column carrying the contaminants through the conduit;

directing the flow entering the inlet port of the conduit to pass through the electromagnetic field along a path extending through and substantially orthogonal to each turn of the electrical conductor forming the first and second coil layers; and discharging the fluid exiting from the outlet port of the conduit as a processed feed stream.

2. A method of removing contaminants from a fluid column, comprising the steps of:

(a) providing an apparatus comprising a length of conduit having a fluid impervious boundary wall with an inner surface and an outer surface and having a fluid entry port and a fluid discharge port;

an electrical conductor coiled around a segment of said conduit to form a first coil layer and a second coil layer, said coil layers being disposed coaxially and radially spaced apart from one another to form an open-air cooling duct extending substantially parallel to the longitudinal axis of the conduit; and an electrical power supply coupled to the electrical conductor, said power supply having a capacity to energize the coiled electrical conductor and produce an electromagnetic field within the inner surface of the fluid impervious boundary wall of the conduit;

(b) introducing a feed stream of contaminants carried within a fluid column to the inlet port of the conduit to establish a flow of the fluid column carrying the contaminants through the conduit;

(c) directing the flow entering the inlet port of the conduit to pass through the electromagnetic field along a path extending through and substantially orthogonal to coils of the coiled electrical conductor forming the first and second coil layers; and (d) discharging the fluid exiting from the outlet port of the conduit as a processed feed stream.

* * * * *